United States Patent [19]

Knauf et al.

[11] Patent Number: 5,453,473
[45] Date of Patent: Sep. 26, 1995

[54] REDUCED FOULING IN PROCESS FOR PRODUCTION OF EP

[75] Inventors: Thomas F. Knauf; Akhtar Osman; Dilipkumar Padliya, all of Sarnia, Canada

[73] Assignee: Bayer Rubber Inc., Sarnia, Canada

[21] Appl. No.: 150,651

[22] Filed: Nov. 9, 1993

[51] Int. Cl.6 .................................. C08F 2/06; C08F 4/68
[52] U.S. Cl. .......................... 526/153; 526/151; 526/281; 526/282; 502/110
[58] Field of Search ................................ 526/151, 153, 526/281, 282

[56] References Cited

U.S. PATENT DOCUMENTS

| | | | |
|---|---|---|---|
| 3,113,115 | 12/1963 | Ziegler et al. | 252/459 |
| 3,166,517 | 1/1965 | Ro | 252/459 |
| 3,300,459 | 1/1967 | Natta et al. | 260/88.2 |
| 3,478,002 | 11/1969 | Nakaguchi et al. | 526/153 |
| 3,539,541 | 11/1970 | Sonnenfeld | 526/153 |
| 3,767,630 | 10/1973 | Dall'Asta et al. | 260/807 |

*Primary Examiner*—David W. Wu
*Attorney, Agent, or Firm*—Joseph C. Gil; Godfried R. Akorli

[57] ABSTRACT

A process for producing EP and EPDM polymers with a reduction in fouling is provided, which process comprises polyemrizing ethylene, an alpha-olefin and a nonconjugated diolefin (if utilized) in a polymerization medium comprising a hydrocarbon diluent at a temperature of from about −50° C. to about 150° C. in the presence of a catalyst system comprising (a) a vanadium compound, (b) diethyl aluminum chloride, ethyl aluminum sesquichloride or ethyl aluminum dichloride and (c) an organo aluminum compound of the formula $R_3Al$ wherein R is an alkyl group having from 8 to 12 carbon atoms and, optionally, triethyl aluminum, the molar ratio of chloride in diethyl aluminum chloride to the total aluminum content in (b) and (c) being from about 0.7:1 to about 0.95:1, the molar ratio of the chloride in ethyl aluminum sesquichloride to the total aluminum content in (b) and (c) being from about 0.7:1 to about 1.4:1 and the molar ratio of the chloride in ethyl aluminum dichloride to the total aluminum content in (b) and (c) being from about 0.7:1 to about 1.8:1 and the ratio of the mols of vanadium compound to the total mols of diethyl aluminum chloride and ethyl aluminum sesquichloride being from about 1:10 to about 1:50 to the desired conversion.

2 Claims, No Drawings

REDUCED FOULING IN PROCESS FOR PRODUCTION OF EP

FIELD OF THE INVENTION

The present invention relates to a process for the polymerization of olefins and more particularly to a polymerization process whereby elastomeric ethylene-alpha-olefin and elastomeric ethylene-alpha olefin-nonconjugated diolefin polymers are produced with a reduction in fouling of the reaction vessel.

BACKGROUND OF THE INVENTION

Various processes and catalysts exist for the copolymerization of ethylene and alpha-olefins. For example, U.S. Pat. No. 3,113,115 discloses that a plastomeric copolymer of ethylene and propylene may be prepared using a catalyst system comprising diethyl aluminum chloride and titanium tetrachloride while U.S. Pat. No. 3,300,459 discloses that an elastomeric copolymer of ethylene and propylene containing from 20 to about 70 weight percent ethylene can be prepared using a catalyst system comprising trihexyl aluminum and vanadium oxychloride. From this technological base, processes for the production of the commercially important elastomeric ethylene-propylene copolymers, commonly referred to as EP elastomers, and the elastomeric terpolymers of ethylene, propylene and a nonconjugated diolefin, generally referred to as EPDM elastomers have been developed.

U.S. Pat. No. 3,166,517 discloses that a catalyst system prepared by reacting, in the presence of carbon tetrachloride or trichloromonofluoromethane, (a) aluminum triisobutyl, diisobutylaluminum chloride or isobutyl aluminum dichloride and the reaction product of 0.5 to 2 moles of aluminum chloride with 1 mol of aluminum triisobutyl, with (b) vanadium tris(acetylacetonate); the proportions of (a) and (b) being selected so that the value of the molar ratio of isobutyl radicals to vanadium atoms is at least 6:1, can be used for the production of EP and EPDM elastomers by polymerization of the appropriate monomers.

U.S. Pat. No. 3,767,630 discloses that high molecular weight copolymers of ethylene, propylene and 1,3-butadiene which are linear, unsaturated and amorphous can be prepared by a process wherein the aforementioned monomers are polymerized in the presence of an aromatic hydrocarbon using a catalytic system that comprises (a) at least one hydrocarbon soluble vanadium compound selected from the group consisting of vanadium halides, vanadium oxyhalides, vanadium acetylacetonates, vanadyl acetylacetonates, vanadyl halogenacetylacetonates, vanadium alcoholates and vanadyl halogen-alcoholates; (b) the product of the reaction between at least one dialkyl-aluminum monohalide having a linear or branched alkyl radical containing up to 16 carbon atoms and in which the halide is chlorine or bromine, and water, in a molar ratio of 2:1, and (c) at least one organic aluminum compound containing halogen, the ratio between the aluminum atoms of components (b)+(c) and the vanadium atoms of compound (a) being between 10:1 and 60:1 and the molar ratio between component (c) and component (b) being between 1:10 and 10:1.

The majority of the current EP and EPDM production processes are of the continuous type and the Ziegler-Natta catalysts used for the production of the high molecular weight elastomers are soluble catalysts formed from vanadium compounds such as vanadium tetrachloride, vanadium trisacetylacetonate, vanadium trialkoxides and halogenated vanadium alkoxides which are used singly or as mixtures in conjunction with an organoaluminum compound such as triethyl aluminum, diethyl aluminum chloride or ethyl aluminum sesquichloride. However, use of such catalyst systems are not without their problems as the processes are difficult to carry on for sustained periods.

There is a tendency for material to build up and adhere to the walls and to the agitation means of the reaction vessel containing the polymerization mixture thereby reducing the heat transfer capability of the equipment necessary for proper control of the reaction. Moreover, the mixing capability of the agitation means is altered, resulting in the homogeneous distribution of the species present in the reaction vessel being adversely affected.

SUMMARY OF THE INVENTION

It is an objective of this invention to provide a process for the preparation of high molecular weight elastomeric ethylene-alpha-olefin polymers with a reduction in fouling of the reaction vessel.

Thus, in accordance with the present invention, there is provided a process for producing high molecular weight elastomeric ethylene-alpha-olefin polymers with a reduction in fouling which process comprises the steps of:

(i) adding ethylene, an alpha-olefin monomer and a polymerization medium comprising a hydrocarbon diluent to a reaction vessel, said ethylene and alpha-olefin being added in amounts and under pressure sufficient to maintain the desired ethylene-alpha-olefin ratio in the polymerization medium at a temperature of from about −50° C. to about 150° C. in the reaction vessel; and (ii) adding to the mixture of monomers and polymerization medium a catalyst system dissolved in said polymerization medium, said catalyst system comprising a mixture of (a) a vanadium compound selected from the group consisting of vanadium halides, vanadium oxyhalides, vanadium trisacetylacetonate, vanadyl diacetyl-acetonate, vanadyl halogen-acetylacetonates, vanadium alcoholates, and vanadyl halogen-alcoholates; (b) an alkyl aluminum chloride compound selected from the group consisting of diethyl aluminum chloride, ethyl aluminum sesquichloride and ethyl aluminum dichloride and (c) an organo aluminum compound of the formula $R_3Al$ wherein R is an alkyl group having from 8 to 12 carbon atoms and optionally triethyl aluminum, the molar ratio of chloride in the diethyl aluminum chloride to the total aluminum content in the diethyl aluminum chloride (b) plus said organo aluminum compound (c) being in the range of from about 0.7:1 to about 0.95:1, the molar ratio of chloride in the ethyl aluminum sesquichloride to the total aluminum content in the ethyl aluminum sesquichloride (b) plus the organo aluminum compound and optionally the triethyl aluminum (c) being in the range of from about 0.7:1 to about 1.4:1 and the molar ratio of chloride in the ethyl aluminum dichloride to the total aluminum content in the ethyl aluminum dichloride (b) plus the organo aluminum compound and optionally triethyl aluminum being the range of from about 0.7:1 to about 1.8:1 and the ratio of the mols of said vanadium compound to the total mols of said alkyl aluminum chloride compound plus said organo aluminum compound being in the range of from about 1:10 to about 1:50;

(iii) reacting the mixture for a time sufficient to cause polymerization of said ethylene and alpha-olefin to an elastomeric polymer, and (iv) recovering the elastomeric polymer.

DETAILED DESCRIPTION OF THE INVENTION

In the description of the process of the present invention, it is to be understood that the term ethylene-alpha-olefin polymers may also encompass the term ethylene-alpha-olefin-nonconjugated diolefin polymers.

Now, in accordance with the present invention, it has been found that high molecular weight elastomeric ethylene-alpha olefin polymers and elastomeric ethylene-alpha-olefin-nonconJugated diolefin polymers can be produced with a reduction in fouling of the reaction vessel by a process comprising the polymerization of the appropriate monomers in a polymerization medium comprising a hydrocarbon diluent wherein there is dissolved a catalyst system comprising three essential components (a) a vanadium compound, (b) an alkyl aluminum chloride compound and (c) an organo aluminum compound and optionally triethyl aluminum. Such a catalyst system is capable of polymerizing the monomers in a reasonable time with the production of polymers having the desired microstructure, molecular weight and Mooney viscosity in addition to the reduction in fouling.

The vanadium compound useful in the production of the catalyst system utilised in the process of this invention is selected from the group consisting of vanadium halides, vanadium oxyhalides, vanadium trisacetylacetonate, vanadyl diacetylacetonate, vanadyl-halogen-acetyl acetonates, vanadium alcoholates and vanadyl halogen-alcoholates. Illustrative non-limiting examples of suitable vanadium compounds include vanadium tetrachloride, vanadium tetrabromide, vanadium oxychloride, vanadium trisacetylacetonate, vanadyl diacetylacetonate, vanadyl chlorodiacetylacetonate and ethyl ortho vanadate, the preferred vanadium compound being vanadium trisacetylacetonate.

The alkyl aluminum chloride compound that is suitable for use in the catalyst system of the present invention is selected from the group consisting of diethyl aluminum chloride and ethyl aluminum sesquichloride, the ethyl aluminum sesquichloride containing equimolar amounts of diethyl aluminum chloride and ethyl aluminum dichloride. The preferred alkyl aluminum chloride compound for use in the catalyst system is diethyl aluminum chloride.

The third component of the catalyst system used in the process of the present invention is an organo aluminum compound with the general formula $R_3Al$ wherein R is a hydrocarbon group containing from 8 to 12 carbon atoms. Groups which may be represented by R are exemplified by the straight and branched chain aliphatic hydrocarbon groups such as octyl, 2-ethylhexyl, decyl, dodecyl and the like. Illustrative non-limiting examples of suitable organo aluminum compounds include trioctyl aluminum, tridecyl aluminum, tridodecyl aluminum and the like.

In the practice of the present invention, it has been found that as the length of the hydrocarbon chain in the organo aluminum compound is increased, that is as the organo aluminum compound which is used in combination with the vanadium compound and the alkyl aluminum chloride compound to form the catalyst system used in the polymerization process, is varied from tributyl aluminum to trihexyl aluminum to trioctyl aluminum, there is a progressive decrease in the amount of fouling occurring. Thus the preferred organo aluminum compound for use in the catalyst system is trioctyl aluminum or tridecyl aluminum, most preferably trioctyl aluminum.

It should be understood in the practice of the process of this invention that a mixture of one or more of the aforementioned organo aluminum compounds together with triethyl aluminum may be employed in order to obtain a catalyst system wherein there is the desired molar ratio of chloride to total aluminum content together with the desired molar ratio of the group that is sterically larger to the ethyl group. For, it has been found that the degree of activity of the catalyst system slowly decreases as the molar ratio of the group that is sterically larger than the ethyl group is increased from about 1:1 to about 9:1 (albeit whether the contribution from the ethyl group to the molar ratio is from the alkyl aluminum chloride compound alone or whether the contribution is from the ethyl group in both the alkyl aluminum chloride compound and from the triethyl aluminum). While not wishing to be bound by any theories, it is believed that a certain number of ethyl groups must be present in order for reduction of the vanadium compound from one valency state to another to occur, the presence of large amounts of organo aluminum compounds wherein there are sterically large groups hindering the reduction process. Thus, in order to obtain a particular chloride to total aluminum content together with a particular molar ratio of a sterically larger group to the ethyl group, the use of a mixture of two organo aluminum compounds, one of which is triethyl aluminum may be necessary.

In the catalyst system used in the process of this invention, the molar ratio of the amount of chloride in the alkyl aluminum chloride compound to the total amount of aluminum in the alkyl aluminum chloride compound and the organo aluminum compound is of importance in ensuring the activity of the catalyst system. When the alkyl aluminum compound used as one of the components of the catalyst system is diethyl aluminum chloride, the molar ratio of the amount of chloride in the diethyl aluminum chloride to the total aluminum content in the diethyl aluminum chloride plus the organo aluminum compound preferably is in the range of from about 0.7:1 to about 0.95:1, most preferably in the range of from about 0.8:1 to about 0.9:1. However, when the alkyl aluminum chloride compound employed as one of the components of the catalyst system is ethyl aluminum sesquichloride, the molar ratio of the amount of chloride in the ethyl aluminum sesquichloride, to the total aluminum content in the ethyl aluminum sesquichloride plus the organo aluminum compound and optionally the triethyl aluminum preferably should be in the range of from about 0.7:1 to about 1.4:1, most preferably in the range of from about 0.8:1 to about 1.2:1. When the alkyl aluminum chloride compound employed as one of the components of the catalyst system is ethyl aluminum dichloride, the molar ratio of the amount of chloride in the ethyl aluminum dichloride to the total aluminum content in the ethyl aluminum dichloride plus the organo aluminum compound and optionally triethyl aluminum should be in the range of from about 0.7:1 to about 1.8:1.

The relative proportions of the vanadium and total aluminum content, that is the molar ratio of vanadium to aluminum is also of importance in ensuring that the catalyst system is active. Thus, the ratio of the mols of the vanadium compound to the total mols of the alkyl aluminum chloride compound and the organo aluminum compound and optionally triethyl aluminum is in the range of from about 1:10 to about 1:50, preferably in the range of from about 1:10 to about 1:35 when the polymer to be produced is an ethylene-alpha-olefin-nonconjugated diolefin polymer.

Elastomeric polymers comprised of ethylene and an alpha-olefin and elastomeric polymers comprised of ethylene, an alpha-olefin and one or more nonconjugated diolefins are prepared by polymerization of the appropriate monomers in the presence of the aforementioned catalyst system.

The alpha-olefins suitable for use in the preparation of the elastomeric polymers are preferably alpha-olefins having from 3 to 6 carbon atoms. Illustrative nonlimiting examples of such alpha-olefins are propylene and 1-butene, propylene being the alpha-olefin of choice.

The nonconjugated diolefins suitable for use in the preparation of the polymers can be straight chain, branched chain or cyclic hydrocarbon diolefins having from 6 to 15 carbon atoms. Illustrative nonlimiting examples are the straight chain acyclic diolefins such as 1,4-hexadiene and 1,6-octadiene, the branched chain acyclic diolefins such as 5-methyl-1,4-hexadiene, 7-methyl-1, 6-octadiene and 7-methyl-1, 7-octadiene; single ring alicyclic diolefins such as 1,4-cyclohexadiene and 1,5-cyclooctadiene, and multi ring alicyclic fused and bridged ring diolefins such as tetrahydro indene, dicyclopentadiene, 5-vinylidene-2-norbornene, 5-ethylidene-2-norbornene and 5-isopropylidene-2-norbornene: 1,4-hexadiene, 7-methyl-1,6-octadiene, dicyclopentadiene and 5-ethylidene-2-norbornene are the preferred nonconjugated diolefins and 5-ethylidene-2-norbornene is the most preferred nonconjugated diolefin.

The alpha-olefin is generally incorporated into the polymer at the level of about 25 to about 70 weight percent, preferably from about 35 to about 65 weight percent. The nonconjugated diolefin is generally incorporated into the elastomeric polymer at the level of about 0.5 to about 15 weight percent, more preferably at the level of about 1 to about 10 weight percent. If more than one nonconjugated diolefin is incorporated into the polymer, the total amount of nonconjugated diolefin incorporated is within the limits specified for the incorporation of one nonconjugated diolefin.

Polymerization of the aforementioned monomers using the catalyst system of the process of the present invention is carried out in a polymerization medium containing an inert hydrocarbon which is a solvent at least for ethylene, the alpha-olefin and the nonconjugated diolefin (if utilized) and the catalyst system. When the polymerization procedure is a slurry polymerization, one of the reactants, the alpha-olefin, may be used as the polymerization diluent, or a hydrocarbon in which the product polymer is insoluble may be used as the diluent. Polymerization of the aforementioned monomers may be carried out in a batchwise or continuous manner, the process of continuous slurry polymerization being preferred in which ethylene, the alpha-olefin, the conjugated diolefin (if utilized) and the catalyst are continuously supplied to the reaction zone and the product polymer is formed as a slurry in the liquid phase. Suitable inert hydrocarbons for use as the polymerization medium are those selected from the group consisting of $C_4$ to $C_8$ aliphatic hydrocarbons, $C_5$ to $C_{10}$ cyclic aliphatic hydrocarbons, $C_6$ to $C_9$ aromatic hydrocarbons, $C_3$ to $C_8$ monoolefinic hydrocarbons and mixtures thereof. Illustrative examples of the aforementioned hydrocarbons include, but are not limited to, straight and branched chain hydrocarbons such as butane, isobutane, pentane, hexane, octane and the like, cyclic and alicyclic hydrocarbons such as cyclopentane, cyclohexane, cycloheptane, ethylcyclopentane, methylcyclohexane, methylcycloheptane and the like, and alkyl-substituted aromatic hydrocarbons such as toluene, xylene and the like and liquid olefins which may act as monomers or comonomers including propylene, 1-butene and the like.

The polymerization process is generally carried out at temperatures in the range of about −20° C. to about 100° C., preferably in the range of about 0° C. to about 80° C., and under pressures of the order of about 5 to about 700 psig.

Without limiting in any way the scope of the invention, one means by which the polymerization process may be carried out is by first introducing the hydrocarbon diluent into a stirred tank reactor together with the alpha-olefin and the diolefin (if utilized) and adjusting the pressure so that the temperature of the reactor contents are brought to the desired level. Feed ethylene gas is introduced either into the vapour phase of the reactor, or sparged into the liquid phase as is well known in the art. Subsequently, a hydrocarbon solution of the vanadium compound and a hydrocarbon solution of the alkyl aluminum chloride compound together with the organo aluminum compound in the required ratios are introduced in the liquid phase. The polymerization occurs substantially in the liquid phase, a slurry of the product high molecular weight elastomer being formed in the hydrocarbon diluent. The rate of polymerization is controlled by the rate of catalyst addition. The reactor temperature and pressure may be controlled through the vaporization of the liquid phase as well as by cooling coils, jackets etc. The ethylene content of the polymer product is controlled by manipulating the respective feed rates of the ethylene and the alpha olefin to the reactor and by the concentration of the catalyst components. The polymer product molecular weight may be controlled by controlling other polymerization variables such as the temperature or the polymer product molecular weight may be controlled by the introduction of a molecular weight modifier such as hydrogen gas or diethyl zinc, as is well known in the art. The polymer product thus obtained is recovered in a conventional manner by flashing off the lower boiling compounds either at reduced pressure or by treatment of the slurry with a mixture of steam and hot water and by the use of a devolatilizing extruder or by further steam stripping and subsequent dewatering and drying. In a continuous process the mean residence time of the catalyst and polymer in the reactor is generally from about 20 minutes to 8 hours, and preferably 30 minutes to 6 hours and more preferably 1 to 4 hours.

In the examples which illustrate the practice of the invention, the analytical techniques described below were employed. The Mooney viscosity of the products was determined according to ASTM method D-1646.

The weight percent ethylene in the polymer products was determined by Fourier Transform Infra Red (FTIR) spectrometry. Polymeric films were pressed at 150° C. and the spectra recorded and the ethylene content was determined by integrating the absorbance peaks at 720 $cm^{-1}$ and 1153 $cm^{-1}$ and performing the calculation using empirically derived relationships.

The following examples are intended to illustrate specific embodiments of the invention and are not intended to limit the scope of the invention.

Example 1

This example describes the copolymerization of ethylene and propylene using a catalyst system comprising vanadium trisacetylacetonate, diethyl aluminum chloride and trioctyl aluminum wherein solutions of diethyl aluminum chloride and trioctyl aluminum are mixed together in the molar ratio of 9:1.

Trioctyl aluminum was mixed with diethyl aluminum chloride to give a mixture having an average composition of $Et_{1.8}Oct_{0.3}Al_{1.0}Cl_{0.9}$ by mixing a 1 molar solution of diethyl aluminum chloride in hexane (900 ml, 0.9 mol) with trioctyl aluminum (144.9 g, 0.1 mol) under an atmosphere of argon.

A continuous polymerization reaction was run in a reactor provided with agitation and fitted with an evaporative cooling device. The reactor was first charged with propylene and butane and the reactor contents equilibrated at a temperature of 10° C. Continuous flows of gaseous ethylene, cyclohexane, a 2.0 weight percent solution of a diethyl aluminum chloride and trioctyl aluminum in cyclohexane and a 0.2 weight percent solution of vanadium trisacetylacetonate in toluene were then fed to the reactor, the pressure being periodically adjusted to about 67 psig in order to maintain the temperature at 10° C. On commencement of the reaction after about 30 minutes, the reactor was put into a continuous mode of operation with continuous flows of propylene and a 0.1 weight percent solution of the molecular weight modifier diethyl zinc in cyclohexane also being fed to the reactor. The reaction feed recipe based on the molar ratios of the various components to 100 moles of propylene was:

| | |
|---|---|
| ethylene | 32.5 |
| propylene | 100 |
| trioctyl aluminum/diethyl aluminum chloride | 0.0194 |
| vanadium trisacetylacetonate | 0.00067 |

The mean residence time in the reactor was of the order of 1.5 hours. The polymer slurry was then collected in a vessel containing water to which an antioxidant had been added and subsequently stripped with steam in order to remove the residual hydrocarbons and dried.

After the polymerization had been carried on for 12 hours, the polymerization was stopped. The reactor was then emptied and flushed with water prior to being opened and examined in order to determine the extent of fouling on the interior walls. There was found to be ethylene-propylene polymer adhering to the shaft of the agitator above the blades and near the base of the instrument probes and baffles with a thin layer of polymer extending across the bottom of the reactor and up the sides of the reactor where it was somewhat thicker.

The polymer produced in the process was analyzed for its composition, glass transition temperature and Mooney viscosity and the results are given in Table I.

A series of control polymerization reactions were run under similar conditions using a 2.0 weight percent solution of diethyl aluminum chloride in cyclohexane in place of the 2.0 weight percent solution of a mixture of diethyl aluminum chloride and trioctyl aluminum. On opening and examining the reactor for fouling, it was found that the extent of fouling on the interior walls was more severe than in the copolymerization process where the mixture of diethyl aluminum chloride and trioctyl aluminum was used as a component of the catalyst system. For, the ethylene-propylene polymer adhering to the shaft of the agitator just above the blades, the baffles and near the base of the instrument probe was considerably thicker, in addition to which there were ribbons of polymer attached to the agitator shaft. Furthermore, the layer of polymer extending across the bottom of the reactor and up the sides of the reactor was considerably thicker. The copolymer produced was analyzed for its composition, molecular weight, glass transition temperature and Mooney viscosity and the results are given in Table I.

From the results in Table I, it can be seen that the ethylene-propylene polymer produced using a mixture of diethyl aluminum chloride and trioctyl aluminum having an average composition of $Et_{1.8}Oct_{0.3}Al_{1.0}Cl_{0.9}$ as the cocatalyst is similar in its properties to that produced using diethyl aluminum chloride. The reduction in the amount of fouling in the polymerization process compared to that occurring in the control is very significant.

Example 2

This example describes the terpolymerization of ethylene, propylene and 5-ethylidene-2-norbornene using a catalyst system comprising vanadium trisacetylacetonate, diethyl aluminum chloride and trioctyl aluminum wherein solutions of diethyl aluminum chloride and trioctyl aluminum are mixed together in the molar ratio of 9:1.

Trioctyl aluminum was mixed with diethyl aluminum chloride to give a mixture having an average composition of $Et_{1.8}Oct_{0.3}Al_{1.0}Cl_{0.9}$ by mixing a 1 molar solution of diethyl aluminum chloride in hexane (900 ml, 0.9 mol) with trioctyl aluminum (144.9 g, 0.1 mol) under an atmosphere of argon.

A continuous polymerization reaction was run in a similar manner and under similar conditions to those in Example 1 with the exception that the reactor was first charged with propylene, 5-ethylidene-2-norbornene (ENB) and butane. The reactor feed recipe based on the molar ratio of the various components to 100 moles of propylene was:

| | |
|---|---|
| ethylene | 19.0 |
| propylene | 100.0 |
| 5-ethylidene-2-norbornene (ENB) | 1.08 |
| trioctyl aluminum/diethyl aluminum chloride | 0.0124 |
| vanadium trisacetyl acetonate | 0.00125 |

After the polymerization had been carried on for 60 hours, the polymerization was stopped. After the reactor had been emptied, it was determined that approximately 50 percent of the operating volume had been lost due to fouling.

The polymer produced in the process was analyzed for its composition glass transition temperature and Mooney viscosity and the results are given in Table I.

Control reactions were run under similar conditions using diethyl aluminum chloride in place of the mixture of diethyl aluminum chloride and trioctyl aluminum and after only 30 to 40 hours of operation, it was estimated that 150 percent of the operating volume of the reactor was lost.

From the results in Table I, it can be seen that the ethylene-propylene-5-ethylidene-2-norbornene polymer produced using a mixture of diethyl aluminum chloride and trioctyl aluminum having an average composition of $Et_{1.8}Oct_{0.3}Al_{1.0}Cl_{0.9}$ as the cocatalyst is similar to that produced using diethyl aluminum chloride as the cocatalyst.

The amount of fouling occurring in the polymerization process using the diethyl aluminum chloride-trioctyl aluminum cocatalyst compared to that in the control is reduced.

TABLE I

| Example (Cocatalyst) | Ethylene content (weight %) | ENB content (weight %) | $T_g$ °C. | ML(1 + 8 @ 100° C.) |
|---|---|---|---|---|
| 1. $(Et_{1.8}Oct_{0.3}Al_{1.0}Cl_{0.9})$* | 58.5 | — | −57 | 61 |
| 1. $(Et_{2.0}Al_{1.0}Cl_{1.0})$* | 55 to 61 | — | −57 to −64 | 59 to 78 |
| 2. $(Et_{1.8}Oct_{0.3}Al_{1.0}Cl_{0.9})$ | 46 | 6.9[1] | −55 | — |
| 2. $(Et_{2.0}Al_{1.0}Cl_{1.0})$* | 43–52 | 10.4–11.5[2] | −48 to 51 | — |

*Control reactions
[1] The target for ENB was 7.5%
[2] The target for ENB was >10%

What is claimed is:

1. A process for producing elastomeric ethylene-propylene polymers with a reduction in fouling which process comprises the steps of:
   (i) adding ethylene, propylene and a polymerization medium comprising a hydrocarbon diluent selected from the group consisting of $C_4$ to $C_8$ aliphatic hydrocarbons, $C_5$ to $C_{10}$ cyclic aliphatic hydrocarbons, $C_6$ to $C_9$ aromatic hydrocarbons, $C_3$ to $C_8$ monoolefinic hydrocarbons and mixtures thereof to a reaction vessel, said ethylene and propylene being added in amounts and under pressure sufficient to maintain the desired ethylene-propylene ratio in the polymerization medium at a temperature of from about −50° C. to about 150° C. in the reaction vessel;
   (ii) adding to the mixture of monomers and polymerization medium a catalyst system dissolved in said polymerization medium, said catalyst system comprising a mixture of (a) vanadium trisacetylacetonate; (b) diethyl aluminum chloride and (c) trioctyl aluminum, the molar ratio of chloride in the diethyl aluminum chloride to the total aluminum content in the diethyl aluminum chloride and the trioctyl aluminum being in the range of from about 0.7:1 to about 0.95:1 and the ratio of the moles of vanadium trisacetylacetonate to the total moles of diethyl aluminum chloride and trioctyl aluminum being in the range of from about 1:10 to about 1:50 wherein said diethyl aluminum chloride and said trioctyl aluminum being mixed together prior to addition to said mixture of monomers and polymerization medium;
   (iii) reacting the mixture for a time sufficient to permit polymerization of the ethylene and propylene to an elastomeric polymer; and
   (iv) recovering the elastomeric polymer.

2. A process for producing elastomeric ethylene-propylene-5-ethylidene-2-norbornene polymers with a reduction in fouling which process comprises the steps of:
   (i) adding ethylene, propylene, 5-ethylidene-2-norbornene and a polymerization medium to a reaction vessel, said ethylene, propylene and 5-ethylidene-2-norbornene being added in amounts and under pressure sufficient to maintain the desired ethylene-propylene-5-ethylidene-2-norbornene ratio in the polymerization medium comprising a hydrocarbon diluent selected from the group consisting of $C_4$ to $C_8$ aliphatic hydrocarbons, $C_5$ to $C_{10}$ cyclic aliphatic hydrocarbons, $C_6$ to $C_9$ aromatic hydrocarbons, $C_3$ to $C_8$ monoolefinic hydrocarbons and mixtures thereof at a temperature of from about −50° C. to about 150° C. in the reaction vessel; and
   (ii) adding to the mixture of monomers and the polymerization medium a catalyst system dissolved in said polymerization medium, said catalyst system comprising a mixture of (a) vanadium trisacetylacetonate, (b) diethyl aluminum chloride and (c) trioctyl aluminum, the molar ratio of chloride in the diethyl aluminum chloride to the total aluminum content in the diethyl aluminum chloride and the trioctyl aluminum being in the range of from about 0.7:1 to about 0.95:1 and the ratio of the moles of vanadium trisacetylacetonate to the total moles of diethyl aluminum chloride and trioctyl aluminum being in the range of from about 1:10 to about 1:35 wherein said diethyl aluminum chloride and said trioctyl aluminum being mixed together prior to addition to said mixture of monomers and polymerization medium;
   (iii) reacting the mixture for a time sufficient to permit polymerization of the ethylene, propylene and 5-ethylidene-2-norbornene to an elastomeric polymer, and
   (iv) recovering the elastomeric polymer.

* * * * *